United States Patent [19]
Bragg

[11] 3,788,039
[45] Jan. 29, 1974

[54] FUEL TANK INERTING SYSTEM WITH MEANS TO IMPROVE THERMAL STABILITY OF FUEL

[75] Inventor: Kenneth R. Bragg, Redondo Beach, Calif.

[73] Assignee: Parker-Hannifin Corporation, Cleveland, Ohio

[22] Filed: Aug. 24, 1972

[21] Appl. No.: 283,332

[52] U.S. Cl.................. 55/160, 55/196, 220/88 B, 244/135, 261/78 A
[51] Int. Cl........................................... B01d 19/00
[58] Field of Search. 55/21, 53, 159, 160, 182, 196; 62/52, 55; 220/88; 244/135; 261/78 A

[56] References Cited
UNITED STATES PATENTS

| | | | |
|---|---|---|---|
| 3,691,730 | 9/1972 | Hickey et al. | 55/196 X |
| 3,628,758 | 12/1971 | Nichols | 55/53 X |
| 3,710,549 | 1/1973 | Nichols et al. | 55/160 |
| 3,590,559 | 7/1971 | Bragg et al. | 55/160 |
| 2,764,873 | 10/1956 | Mooyaart | 62/55 |

*Primary Examiner*—Samih N. Zaharna
*Assistant Examiner*—Richard W. Burks
*Attorney, Agent, or Firm*—Donnelly, Maky, Renner & Otto

[57] ABSTRACT

A fuel tank inerting system characterized in the provision of mixing means such as an aspirator or ejector to promote the diffusion equilibrium between the fuel and the nitrogen-rich ullage gas in the fuel tank to decrease the amount of oxygen dissolved in the fuel to just a few parts per million (ppm) thereby to improve the thermal stability of the fuel such that the temperature at which the fuel enters the engine can be increased without causing excessive coking, slugging and varnishing. Such improved thermal stability of the fuel allows greater heat injection into the fuel or alternatively enables the use of a normally less thermally stable fuel at reduced fuel cost.

10 Claims, 1 Drawing Figure

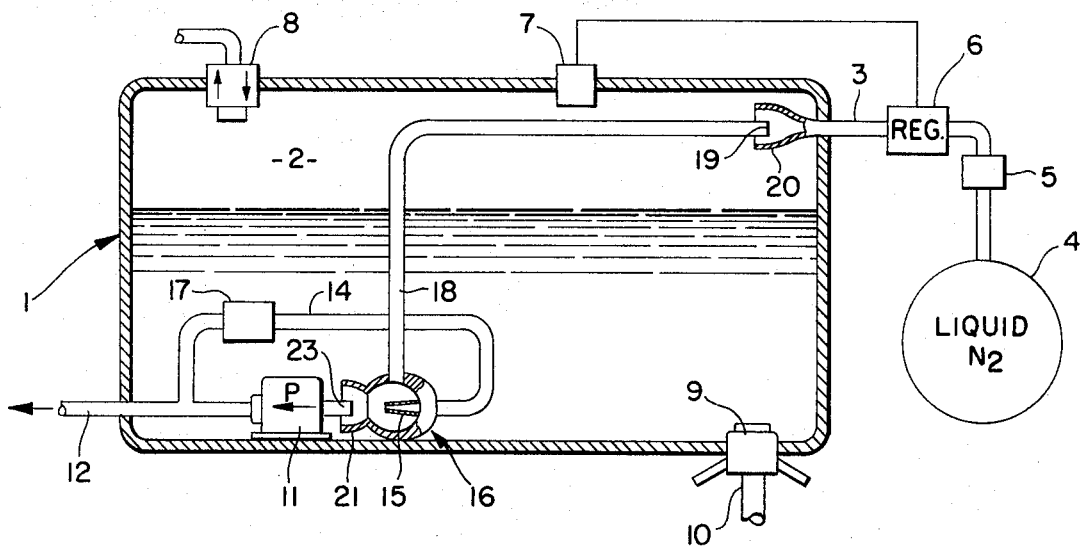

FUEL TANK INERTING SYSTEM WITH MEANS TO IMPROVE THERMAL STABILITY OF FUEL

BACKGROUND OF THE INVENTION

In one known method of inerting fuel during the filling of an aircraft fuel tank as disclosed in the U.S. Pat. No. 3,229,446 an inert gas such as nitrogen is injected into a stream of the incoming fuel to scrub oxygen therefrom, the oxygen removed from the fuel being vented from the fuel tank to the atmosphere.

Another known method of inerting an aircraft fuel tank as disclosed in the U.S. Pat. No. 3,590,559 involves the creation and maintenance of an inert atmosphere within the vapor space or ullage of the fuel tank and the removal of excess oxygen from the fuel when it becomes supersaturated with oxygen due to decrease of pressure within the tank as during ascent of the aircraft, such inerting being accomplished by injecting a mixture of fuel and inert gas into the fuel in the tank through a series of submerged nozzles to form bubbles that absorb oxygen in the fuel and carry it to the tank ullage from which it is purged to the atmosphere.

Yet other known fuel tank inerting systems are disclosed for example in the copending applications Ser. Nos. 110,536, 110,862 and 118,300 which respectively disclose mixing of fuel in the tank selectively with nitrogen rich ullage gas or nitrogen from the aircraft dewar, mixing nitrogen-rich ullage gas with incoming fuel during the tank filling operation to scrub oxygen from the fuel and injecting nitrogen into a stream of fuel which is recirculated by a pump in the tank, and injecting nitrogen gas into a stream of fuel which is circulated by a pump in the tank or mixing nitrogen-rich ullage gas with the incoming fuel during the tank filling operation thus to scrub oxygen from the fuel to maintain the ullage gas at a safe, incombustible condition. The aforesaid copending applications each contemplate the introduction of nitrogen gas into the fuel tank ullage so as to pressurize the fuel tank to compensate for the use of the fuel to prevent entry of air into the fuel tank and to maintain the ullage at substantially ambient pressure as during descent of the aircraft again to prevent entry of ambient air into the tank thereby to retain the ullage gas incombustible during flight.

If aircraft jet engine fuel is saturated with air at sea level, it holds approximately 100 ppm oxygen and therefore if the oxygen is scrubbed out of the fuel sufficiently so that the gas which evolves from the fuel during climb of the aircraft remains less than 9 percent oxygen, the ullage gas (including fuel vapor) will be incombustible. In that case, the fuel will contain about 24 ppm oxygen at sea level. At the top of the climb, the fuel will contain approximately 8.3 ppm oxygen because of the reduction of ambient pressure, but this only occurs if the fuel is in diffusion equilibrium with the ullage gases. As known, the fuel will remain supersaturated with oxygen to an unpredictable degree for a substantial length of time unless means are provided to accelerate diffusion to maintain the fuel close to diffusion equilibrium with the ullage gases. Therefore, the amount of oxygen contained in the fuel may be between 24 and 8 ppm without such means to accelerate diffusion.

In the aforesaid known inerting systems nitrogen enters the tank to replace the fuel as it is withdrawn from the tank and thus the oxygen concentration of the ullage may decrease from about 9 percent at the beginning of cruise to about 2.25 percent at the end of the cruise, and if the fuel is in diffusion equilibrium with the ullage at the end of the cruise, there would be about 2.1 ppm oxygen in the fuel.

SUMMARY OF THE INVENTION

In the present invention, the fuel tank inerting system has associated therewith means to improve the thermal stability of the fuel by reducing the amount of oxygen dissolved in the fuel to just a few parts per million, said means comprising a mixing means for mixing nitrogen-rich ullage gases with the fuel in the tank so as to accelerate diffusion and thereby keep the fuel close to diffusion equilibrium with the ullage gases.

In a preferred embodiment of the invention the aforesaid mixing means in the form of an aspirator or ejector is connected to mix fuel bled from the fuel transfer pump feed line with nitrogen-rich ullage gas for discharge into the fuel in the tank in the form of tiny bubbles of ullage gas which promote diffusion equilibrium.

The present invention also preferably includes a pressure sensitive valve in the aforesaid bleed line from the fuel transfer pump feed line arranged so that when the transfer pressure is low because of maximum demand of fuel, said valve closes to prevent circulation of fuel through the aspirator or ejector. Therefore, transfer capacity is not decreased under such conditions of maximum demand of fuel.

Another object of this invention is to install the suction tube inlet for the aspirator or ejector into close proximity with the inert gas inlet into the ullage so that the aspirator receives substantially pure nitrogen gas as it enters the tank to replace the fuel used during flight. In this way, if the aspirator is arranged so that the volume flow rate of gas injected into the fuel is slightly less than the fuel flow rate out of the tank, the injected gas will be substantially uncontaminated by ullage gas and hence the injected gas will have a lower oxygen content than that of the ullage gas.

Yet another object of this invention is to locate the aspirator outlet near the transfer pump inlet so that the fuel will be scrubbed just before entering the transfer pump; thus all of the fuel does not have to be scrubbed at once and a smaller aspirator capacity will suffice.

BRIEF DESCRIPTION OF THE DRAWING

The single FIGURE in the drawing illustrates a fuel tank inerting system which includes means for improving the thermal stability of the fuel as supplied from the tank to the engines.

DETAILED DESCRIPTION OF THE INVENTION

The reference numeral 1 denotes an aircraft fuel tank into the ullage or vapor space 2 of which is supplied an inert gas such as nitrogen through a conduit 3 from an aircraft dewar 4 containing liquid nitrogen, there being a vaporizer 5 and regulator valve 6 in said conduit 3. The regulator valve 6 is controlled by a differential pressure sensing device 7 so as to supply nitrogen gas into the ullage 2 to pressurize the tank 1 and to render the ullage gas incombustible.

The tank 1 is also provided with a vent valve 8 for outflow of venting gases so that the inert gas in the ullage 2 maintains a predetermined pressure differential between the ullage 2 and the decreasing ambient pressure as when the aircraft is climbing. The vent valve 8 may have provision for inflow of air into the ullage 2 as during descent of the aircraft in the event that the inert gas supply is exhausted or inoperative thereby to prevent crushing of the tank 1 by increasing ambient pressure during descent of the aircraft.

The tank 1 is also provided with a fuel inlet valve 9 to which a fueling nozzle 10 is adapted to be coupled to refuel the tank 1.

When the tank 1 is being refueled, the fuel may be inerted as disclosed in the above-referred-to copending applications or as disclosed in the U.S. Pat. No. 3,628,758 wherein the fuel is sprayed or cascaded into the ullage, the ullage being filled with nitrogen to thereby decrease the oxygen content of the fuel. In said U.S. Pat. No. 3,628,758, nitrogen gas is employed to pressurize the fuel in the tank and to prevent entry of air into the tank when tank pressure decreases relative to ambient pressure as during descent of the aircraft.

In the tank 1 is a transfer pump 11 having a fuel feed line 12 connected to its outlet, said feed line 12 having connected thereto a bleed line 14 through which some of the fuel is bled to the nozzle 15 of an aspirator 16. Preferably, said bleed line 14 has therein a pressure sensitive valve 17 which closes the bleed line 14 when the transfer pressure is low because of maximum demand of fuel by the engines. When the pressure sensitive valve 17 is closed, no fuel is bled to the aspirator nozzle 15 and hence the transfer capacity will not be decreased so that the maximum demand for fuel may be satisfied. The suction port of the aspirator 16 has a conduit 18 connected thereto which opens in the tank ullage 2 and, preferably, the inlet end 19 of the conduit 18 is in close proximity with or enters the nitrogen supply nozzle 20 so that the aspirator 16 receives substantially pure nitrogen as it enters the tank ullage 2 to place the fuel. As aforesaid, the aspirator 16 may be arranged so that the volume flow rate of gas injected into the fuel at the aspirator 16 is slightly less than the fuel rate out of the tank 1 so that the injected gas will have minimum contamination by ullage gas. Accordingly, the oxygen content of the fuel at the aspirator outlet 21 will be less than that afforded by equilibrium with the ullage.

Another feature of the preferred embodiment of the invention is that the aspirator outlet 21 is located close to the transfer pump inlet 23 so that the fuel as scrubbed by the aspirator 16 will enter the transfer pump 11 and therefore, all of the fuel does not have to be scrubbed at once whereby a lower aspirator 16 capacity than otherwise will serve the present purposes.

In summary therefore, it can be seen that the present invention comprises a fuel tank inerting system which has a mixing means, i.e. the aspirator or ejector 16 which mixes ullage gas with the fuel in the tank 1 so as to accelerate diffusion and thereby keep the fuel close to diffusion equilibrium with the ullage gas. The fuel transferred from the tank 1 by the transfer pump 11 thus will have an improved thermal stability with just a few ppm oxygen content. By thus improving the thermal stability of the fuel, the temperature at which it enters the engines can be increased without causing excessive coking, slugging and varnishing. Moreover, such fuel with improved thermal stability allows for greater heat injection thereinto or permits the use of a normally less thermally stable fuel at reduced fuel cost. Also, by providing the pressure sensitive valve 17 in the bleed line 14 which leads from the fuel feed line 12 to the aspriator nozzle 15, the maximum demand for fuel by the engines may be satisfied since, at that time, the pressure sensitive valve 17 will be closed so that no demand is made for scrubbing of the fuel by the aspirator 16. Yet another feature of the present invention is the location of the inlet end 19 of the aspirator suction tube 18 to effect injection of substantially pure nitrogen to decrease the oxygen content of the fuel to even a lower value than that afforded by equilibrium with the ullage 2.

I claim:

1. An inerting system for an aircraft fuel tank and the like comprising mixing means having a fuel inlet port, an outlet port in the tank, and a suction port communicated with the tank ullage; means for inducing fuel flow through said mixing means; inert gas supply means for supplying inert gas to render the tank ullage gas incombustible; said mixing means being effective to enhance the diffusion equilibrium of the oxygen content of the fuel and of the ullage gas and to impart improved thermal stability to the fuel withdrawn from the tank during flight of the aircraft; said inert gas supply means having an outlet in the tank ullage; said suction port being in close proximity to said outlet and in the flow path of inert gas from said outlet into the tank ullage for mixing of substantially uncontaminated inert gas with the fuel.

2. An inerting system for an aircraft fuel tank and the like comprising mixing means having a fuel inlet port, an outlet port in the tank, and a suction port communicated with the tank ullage; means for inducing fuel flow through said mixing means; inert gas supply means for supplying inert gas to render the tank ullage gas incombustible; said mixing means being effective to enhance the diffusion equilibrium of the oxygen content of the fuel and of the ullage gas and to impart improved thermal stability to the fuel withdrawn from the tank during flight of the aircraft; said means for inducing fuel flow comprising a fuel transfer pump having an outlet through which fuel is pumped out of the tank and having an inlet in close proximity with said outlet port of said mixing means, and a bleed line through which a portion of the fuel pumped by said transfer pump is conducted to said fuel inlet port of said mixing means.

3. The system of claim 2 wherein valve means in said bleed line decreases the fuel flow in said bleed line when the fuel flow demand in said transfer pump outlet approaches a maximum value.

4. In an inerted fuel tank having a fuel transfer pump which pumps fuel from said tank through a fuel feed line and having inert gas supply means for supplying inert gas to render the tank ullage gas incombustible, the improvement which comprises mixing means having a fuel inlet port, an outlet port in the tank, and a suction port communicated with the tank ullage; and a bleed line communicating said fuel feed line with said inlet port of said mixing means thus to effect mixing of fuel with inert ullage gas to enhance the diffusion equilibrium of the oxygen content of the fuel and of the ullage gas and to impart improved thermal stability to the fuel withdrawn from the tank by said fuel transfer pump; said suction port of said mixing means being in close proximity with said inert gas supply means and in the flow path of inert gas into the tank ullage for mixing of substantially uncontaminated inert gas with the fuel.

5. The inerted fuel tank of claim 4 wherein valve means in said bleed line responsive to predetermined fuel flow in said fuel feed line closes said bleed line.

6. The inerted fuel tank of claim 4 wherein said fuel transfer pump has an inlet in close proximity with said outlet port of said mixing means.

7. An inerting system for an aircraft fuel tank and the like comprising mixing means having a fuel inlet port, an outlet port in the tank, and a suction port communicated with the tank ullage; means for inducing fuel flow through said mixing means; inert gas supply means for supplying inert gas to render the tank ullage gas incombustible; a tank ullage pressure sensing device and regulator valve means associated with said inert gas supply means which closes said regulator valve means when the pressure in the tank ullage reaches a predetermined value in excess of ambient pressure during flight of the aircraft; said mixing means being effective to enhance the diffusion equilibrium of the oxygen content of the fuel and of the ullage gas and to impart improved thermal stability to the fuel withdrawn from the tank during flight of the aircraft; said inert gas supply means having an outlet in the tank ullage; said suction port being in close proximity to said outlet and in the flow path of inert gas from said outlet into the tank ullage for mixing of substantially uncontaminated inert gas with the fuel when said regulator valve means is open and for mixing of incombustible tank ullage gas with the fuel when said regulator valve means is closed.

8. The system of claim 7 wherein said tank has vent valve means to vent the tank ullage to maintain a predetermined tank ullage-ambient pressure differential during flight of the aircraft.

9. The system of claim 8 wherein said vent valve means has provision for entry of ambient air into the tank ullage in the event of discontinuance of supply of inert gas to the tank ullage from said inert gas supply means.

10. The system of claim 7 wherein said means for inducing fuel flow comprises a fuel transfer pump having an outlet through which fuel is pumped out of the tank and having an inlet in close proximity with said outlet port of said mixing means, and a bleed line through which a portion of the fuel pumped by said transfer pump is conducted to said fuel inlet port of said mixing means; said outlet port opening into the fuel in the tank for flow of fuel from the tank to the inlet of said pump.

* * * * *